US007754639B2

(12) United States Patent
Saito et al.

(10) Patent No.: US 7,754,639 B2
(45) Date of Patent: Jul. 13, 2010

(54) CATALYST PRODUCED BY USING MULTI-ELEMENT METAL COLLOID

(75) Inventors: Masayuki Saito, Hiratsuka (JP); Oji Kuno, Toyota (JP); Masanori Yamato, Toyota (JP); Masaya Ibe, Susono (JP)

(73) Assignees: Tanaka Kikinzoku Kogyo K.K., Tokyo (JP); Toyota Jidosha Kabushiki Kaisha, Aichi (JP)

( * ) Notice: Subject to any disclaimer, the term of this patent is extended or adjusted under 35 U.S.C. 154(b) by 69 days.

(21) Appl. No.: 10/548,230

(22) PCT Filed: Mar. 10, 2004

(86) PCT No.: PCT/JP2004/003059

§ 371 (c)(1),
(2), (4) Date: Sep. 2, 2005

(87) PCT Pub. No.: WO2004/080592

PCT Pub. Date: Sep. 23, 2004

(65) Prior Publication Data
US 2007/0060473 A1 Mar. 15, 2007

(30) Foreign Application Priority Data
Mar. 11, 2003 (JP) ............................. 2003-064798

(51) Int. Cl.
*B01J 31/00* (2006.01)
(52) U.S. Cl. ................................. 502/103
(58) Field of Classification Search .............. 502/102, 502/302, 150, 162, 313, 328, 340, 341, 332, 502/330, 167, 325
See application file for complete search history.

(56) References Cited

U.S. PATENT DOCUMENTS 4,537,873 A    8/1985  Kato et al. ................. 502/242

(Continued)

FOREIGN PATENT DOCUMENTS

JP          59-160536          9/1984

(Continued)

OTHER PUBLICATIONS

Okamoto et al. (Tanaka) JP Pub No. 2000-279824, Published Oct. 10, 2000 (Machine translation).*

(Continued)

*Primary Examiner*—Melvin C Mayes
*Assistant Examiner*—Stephanie Cohen
(74) *Attorney, Agent, or Firm*—Roberts & Roberts, LLP (57) ABSTRACT

The present invention is a catalyst comprising one or more kinds of catalyst metal, a promoter metal composed of at least one element selected from alkaline earth metals, transition metals, rare earth metals, aluminum and gallium, and a support, wherein the catalyst metal and the promoter metal are supported on the support through allowing a multi-element metal colloid solution to be attached to the support, and the multi-element metal colloid solution comprises a solvent comprising water or a mixture of water and an organic solvent, metal cluster particles which are dispersed and suspended in the solvent and composed of one or more kinds of catalyst metal, a protective agent for protecting the metal cluster particles, and one or more kinds of metal ions bonded to the protective agent, the ions selected from alkaline earth metal ions, transition metal ions, rare earth metal ions, aluminum ions and gallium ions.

3 Claims, 3 Drawing Sheets

U.S. PATENT DOCUMENTS 5,187,209 A * 2/1993 Hirai et al. .................. 424/1.29
6,197,720 B1 * 3/2001 Heineke et al. ............. 502/325
6,232,494 B1 * 5/2001 Morgenstern et al. ......... 562/17

FOREIGN PATENT DOCUMENTS

| JP | 2000-015097 | | 1/2000 |
|----|-------------|---|--------|
| JP | 2000-279818 | * | 10/2000 |
| JP | 2000-279818 A | | 10/2000 |
| JP | 2000-279824 | * | 10/2000 |
| JP | 2000-296339 | | 10/2000 |
| JP | 2002-001119 | | 1/2002 |

OTHER PUBLICATIONS

Hirata JP Pub No. 2000-296339, Published Oct. 24, 2000 (Machine translation).*

Muradov et al, photocatalytic production of hydrogen from aqueous solution in the presense of electron donors and catalysts, 1981, react. kinet. catal. lett., col. 17, No. 304, pp. 355-358.*

* cited by examiner

CATALYST PRODUCED BY USING MULTI-ELEMENT METAL COLLOID

TECHNICAL FIELD

The present invention relates to a catalyst. More specifically, the present invention relates to a catalyst in which one or more kinds of catalyst metal and at least one promoter metal of an alkaline-earth metal, a transition metal, a rare earth metal, aluminum and gallium are supported on a support.

BACKGROUND ART

In recent studies on catalysts, those in which a catalyst metal for catalysis alone is supported, and those in which a metal in addition to a catalyst metal is supported in combination for improving activity, improving properties such as prevention of grain growth and prevention of catalyst poisoning, or for imparting additional functions (hereinafter metals supported for improving properties or imparting functions are referred to as a promoter metal) have been developed in many ways. Examples of these include a platinum/rhodium/barium composite catalyst known as a catalyst for purification of car exhaust, which has an NOx adsorption ability.

In addition to the conventional role in combustion of exhaust gas, platinum/rhodium/barium composite catalysts have been developed as a catalyst which can efficiently remove NOx. In these composite catalysts, platinum/rhodium facilitate usual combustion of exhaust gas, while barium, which is a promoter metal, is responsible for NOx adsorption.

It is considered that in such composite, NOx adsorption action according to barium takes place by way of precious metal. The NOx adsorption ability of this composite catalyst is considered to be influenced by the distance between the precious metal and barium supported on the support, and how close they are supported is very important.

For producing a platinum/rhodium/barium composite catalyst, the present inventors have disclosed a catalyst using colloid in the production steps, aiming at improving dispersibility of barium and the supporting state (Japanese Patent Application Laid-open No. 2000-279818 and Japanese Patent Application Laid-open No. 2000-279824). In this case, the colloid means those in which fine particles (cluster particles) of metal or ceramics insoluble in solvent are dispersed or suspended in the solvent, and colloid solutions using liquid as a solvent are generally known. By allowing such colloid to be adsorbed on a support, metal fine particles forming cluster particles can be directly dispersed and supported on a support to a high degree unlike the usual cases of using an aqueous solution.

Referring to these conventional arts, in Japanese Patent Application Laid-open No. 2000-279818, single metal colloid or composite metal colloid comprising one or more kinds of metal particles (e.g., platinum/rhodium bimetallic colloid) is supported on a support which is a porous material, and alkali metal, alkaline-earth metal (e.g., barium) or rare earth metal is allowed to be supported thereon using an aqueous solution of any compound of alkali metal, alkaline-earth metal or rare earth metal.

In addition, Japanese Patent Application Laid-open No. 2000-279824 discloses employing a given polymer organic compound as a protective agent constituting colloid. This protective agent is a compound chemically or physically bonded to or adsorbed on colloid particles in a colloid solution, and prevents colloid particles from agglomerating, thereby controlling the particle distribution to be settled in an appropriate range. In other words, by adding a protective agent, a suspended state of colloid particles of a small particle size can be maintained and when a catalyst is produced, the particle size of catalyst particles can be made smaller and the effective surface area of the catalyst can be increased to the maximum. Although the protective agent is referred to as a chelating agent in this conventional art, both have the same meaning.

In the above-mentioned conventional arts, dispersibility of barium is certainly improved, but they are not necessarily sufficient in that barium and precious metal are to be supported in close vicinity with each other. The present inventors have then confirmed that in the case of catalysts produced according to such conventional arts, all barium actually supported cannot be fully utilized, and the actual utilization ratio thereof is only about a dozen % by mol or so.

The problem as described above is not limited to platinum/rhodium/barium composite catalysts. Other than these exhaust gas purification catalysts, for example, catalysts in which a promoter metal is supported in combination in addition to a catalyst metal are also being studied as catalysts for fuel cells in many cases. In most of these catalysts, it is preferable that the catalyst metal and the promoter metal are supported in close vicinity with each other.

The present invention has been made in view of such circumstances, and aims at providing a catalyst in which a catalyst metal and a promoter metal are supported in combination on a support, wherein they are supported in such a close distance that the characteristics of both metals are sufficiently exhibited.

DISCLOSURE OF THE INVENTION

Catalysts according to the above-mentioned conventional production methods are produced by first allowing catalyst metal (platinum, rhodium) to be supported on a support using colloid, and then allowing promoter metal (barium) to be supported thereon using an aqueous metal salt solution thereof. These conventional arts can improve dispersibility of the promoter metal by forming a uniform aqueous solution when allowing promoter metal to be supported by using an aqueous solution of the promoter metal salt, but it cannot ensure control of the position of the promoter metal to be supported.

The present inventors considered that, according to a method which has a plurality of steps of allowing metal to be supported using metal colloid and allowing metal to be supported using an aqueous metal salt solution, which means that catalyst metal and promoter metal are separately supported as in a conventional method, it is difficult to control the position of the promoter metal to be adsorbed. Accordingly, the present inventors considered that in place of allowing precious metal and promoter metal to be supported by a plurality of steps, it is preferable to allow catalyst metal and promoter metal to co-exist in colloid and to be simultaneously supported using colloid.

Herein, when using colloid in which catalyst metal and promoter metal co-exist, using bimetallic colloid in which both the catalyst metal and the promoter metal form cluster particles is generally considered. On the other hand, as a method of producing colloid, a method in which an aqueous solution of target metal is produced and metal particles are formed by reducing the metal ions in the aqueous solution is common, and the method using bi-metallic colloid is basically the same as this method, while reduction affords a plurality of metals.

However, although precious metals and some poor metals can be formed into cluster particles, some promoter metal is difficult to be formed into cluster particles depending on the kind. For example, alkaline-earth metal such as barium cannot be formed into cluster particles by reducing the metal ions in an aqueous solution.

Under these circumstances, the present inventors conducted studies in order to obtain multi-element metal colloid in which catalyst metal and promoter metal which is difficult to be formed into cluster particles co-exist, and as a result have arrived at an idea of bonding promoter metal, in the form of ions, to a protective agent which is a component of colloid, while forming catalyst metal into cluster particles. Consequently, the inventors have found that in a catalyst in which catalyst metal and promoter metal are supported using such multi-element metal colloid, both metals are present in close vicinity with each other.

Accordingly, the present invention provides a catalyst comprising one or more kinds of catalyst metal, a promoter metal composed of at least one element selected from alkaline earth metals, transition metals, rare earth metals, aluminum and gallium, and a support, wherein the catalyst metal and the promoter metal are supported on the support through allowing a multi-element metal colloid solution to be attached to the support, and the multi-element metal colloid solution comprises a solvent comprising water or a mixture of water and an organic solvent, metal cluster particles which are dispersed and suspended in the solvent and composed of one or more kinds of catalyst metal, a protective agent for protecting the metal cluster particles, and one or more kinds of metal ions bonded to the protective agent, the ions selected from alkaline earth metal ions, transition metal ions, rare earth metal ions, aluminum ions and gallium ions.

The metal colloid employed for producing the catalyst of the present invention has a function similar to that of bimetallic colloid, and can allow precious metal and promoter metal simultaneously to be adsorbed on a substance on which they are to be adsorbed. In this metal colloid, catalyst metal and promoter metal (ions) bonded to protective agent are in close vicinity with each other at a particle level. Thus, in the catalyst of the present invention in which the metal colloid is supported on a support, catalyst metal and promoter metal are supported in close vicinity with each other.

In this regard, as the polymer material which is the protective agent constituting the metal colloid, those containing nitrogen and/or a carboxyl group in a molecule are preferable. This is because the polymer material containing such an element or substituent is easily bonded to promoter metal ions by means of a coordinate bond in the case of a material containing a nitrogen atom, an ionic bond in the case of a material containing a carboxyl group, and a chelate bond in the case of a material containing both. In this aspect, PVP conventionally known as a protective agent for colloid is not appropriate because it lacks ability to bond to metal ions, failing to fix promoter metal on a support when colloid is adsorbed on the support.

Of the polymer materials containing nitrogen and/or a carboxyl group in a molecule, particularly preferred are polyethyleneimine, polyallylamine, poly(N-carboxymethyl)allylamine, poly(N,N-dicarboxymethyl)allylamine and poly(N-carboxymethyl)ethyleneimine. These are preferable in view of the water-solubility of the colloid. In other words, while the solvent for colloid includes water or a mixed solvent of water and an organic solvent, when colloid is not water-soluble, precipitate is generated upon use, making it difficult to handle. The polymer materials listed above have a greater number of nitrogen atoms and/or carboxyl groups in the polymer chain, and this avoids decrease of the dissociation ability in water even if promoter metal ions are bonded. Accordingly, colloid containing such polymer material as a protective agent is highly water-soluble.

As catalyst metal in the catalyst of the present invention, gold, platinum, silver, palladium, rhodium, iridium, ruthenium and osmium may be used. The colloid may be composed of only one kind of these precious metals, but may be composed of a plurality of precious metals as in bimetallic colloid.

The multi-element metal colloid employed in the present invention is preferably produced by first preparing colloid of catalyst metal and adding thereto alkaline-earth metal ions, transition metal ions, rare earth metal ions, aluminum ions or gallium ions. More specifically, an aqueous solution of a salt of catalyst metal is prepared and a solution of a polymer material which is a protective agent is added thereto to prepare a catalyst metal colloid, and by further adding an aqueous solution of a salt of alkaline-earth metal or the like, ions of the alkaline-earth metal or the like are bonded to the protective agent, and the metal colloid according to the present invention can be obtained. Then, the catalyst of the present invention can be produced through allowing this metal colloid to be adsorbed on a support. As a support on which metal colloid is adsorbed, commonly used catalyst supports such as alumina and zirconia may be employed. The present invention can be applied to various catalysts such as catalysts for fuel cells in addition to car exhaust gas purification catalysts.

The catalyst of the present invention can be used with metal colloid being supported on the support as is, but this may be further burned. By burning, the polymer material on the support, which is a protective agent, is evaporated.

BEST MODE FOR CARRYING OUT THE INVENTION

Hereinafter, a preferred embodiment of the present invention is described. In this embodiment, platinum is used as a catalyst metal, five protective agents of polyethyleneimine (hereinafter referred to as PEI), poly(N-carboxymethyl)allylamine (hereinafter referred to as P(CM)AA), poly(N,N-dicarboxymethyl)allylamine (hereinafter referred to as P(DCM)AA) and poly(N-carboxymethyl)ethyleneimine (hereinafter referred to as P(DC)EI) are used as protective agents, and ions of various metals belonging to alkaline-earth metal, transition metal or rare earth metal are bonded to the protective agents as a promoter metal to prepare multi-element metal colloids. These multi-element metal colloids are then supported on a support to produce a catalyst and the supporting state was observed. Here, for the protective agents, a commercial reagent was used as PEI, but other protective agents were first synthesized. In the following, explanation will be made in the order of production of the synthesized protective agents, production of catalyst metal colloid and bonding of promoter metal ions.

A: Synthesis of Protective Agent

(1) Synthesis of P(CM)AA

An aqueous solution in which 20 g (0.5 mol) of NaOH was dissolved in 125 mL of water and an aqueous solution in which 47.3 g (0.5 mol) of chloroacetic acid was dissolved in 100 mL of water were mixed. The mixture was added dropwise to a solution heated to 50° C. in which 28.5 g (0.5 mol equivalent to monomers) of polyallylamine was dissolved in 50 mL of water with stirring. After continuing stirring the solution at 50° C. for 1 hour, an aqueous NaOH solution was added thereto dropwise until the pH of the solution reached pH 10, and the reaction temperature was increased to 95° C. to continue the reaction. The pH became lower as the reaction proceeds, and so pH 10 was maintained through addition of an aqueous NaOH solution according to need. The reaction was continued until the change of the pH was not observed.

After completion of the reaction, an aqueous $HNO_3$ solution was added to obtain a white solution, and after spinning down solid components by a centrifuge, supernatant liquid was removed. An aqueous tetramethylammonium hydroxide solution was added to the precipitate to re-dissolve it and sedimentation with an aqueous $HNO_3$ solution was conducted. Solid components were again spun down by a centrifuge, and supernatant liquid was removed to separate Na ions. These procedures were repeated three times to obtain 32.6 g (0.28 mol) of P(CM)AA.

(2) Synthesis of P(DCM)AA

An aqueous solution in which 80 g (2.0 mol) of NaOH was dissolved in 500 mL of water and an aqueous solution in which 189 g (2.0 mol) of chloroacetic acid was dissolved in 400 mL of water were mixed. The mixture was added dropwise to an aqueous solution, and was heated to 50° C. in which 28.5 g (0.5 mol equivalent to monomers) of polyallylamine was dissolved in 50 mL of water with stirring. After continuing stirring the solution at 50° C. for 1 hour, an aqueous NaOH solution was added thereto dropwise until the pH of the solution reached pH 10, and the reaction temperature was increased to 95° C. to continue the reaction. pH 10 was maintained through addition of an aqueous NaOH solution according to need as in the production of P(CM)AA. The reaction was continued until the change of the pH was not observed.

After completion of the reaction, an aqueous $HNO_3$ solution was added to obtain a white solution, and after spinning down solid components by a centrifuge, supernatant liquid was removed as in the production of P(CM)AA. An aqueous tetramethylammonium hydroxide solution was added to the precipitate to re-dissolve it and sedimentation with an aqueous $HNO_3$ solution was conducted. Solid components were again spun down by a centrifuge and supernatant liquid was removed. These procedures were repeated three times to obtain 58.8 g (0.34 mol) of P(DCM)AA.

(3) Synthesis of P(DC)EI

An aqueous solution in which 40 g (1.0 mol) of NaOH was dissolved in 250 mL of water and an aqueous solution in which 94.5 g (1.0 mol) of chloroacetic acid was dissolved in 200 mL of water were mixed. The mixture was added dropwise to a polyallylamine (28.5 g (0.5 mol equivalent to monomers))/water (50 mL) solution, and was heated to 50° C. with stirring. After continuing stirring the solution at 50° C. for 1 hour, an aqueous NaOH solution was added thereto dropwise until the pH of the solution reached pH 10, and the reaction temperature was increased to 95° C. to continue the reaction. pH 10 was maintained through addition of an aqueous NaOH solution according to need as in the production of P(CM)AA. The reaction was continued until the change of the pH was not observed.

After completion of the reaction, an aqueous $HNO_3$ solution was added to obtain a white solution, and after spinning down solid components by a centrifuge, supernatant liquid was removed. An aqueous tetramethylammonium hydroxide solution was added to the precipitate to re-dissolve it and sedimentation with an aqueous $HNO_3$ solution was conducted. Solid components were again spun down by a centrifuge and supernatant liquid was removed. These procedures were repeated three times to obtain 58.8 g (0.34 mol) of P(DC)EI.

B: Production of Catalyst Metal Colloid

(1) Production of PEI Protected Platinum Colloid (hereinafter Pt-PEI Colloid)

To a diammine dinitro platinum solution corresponding to 2 g of Pt was added 8 g of PEI and 2000 mL of water, and the mixture was heated to reflux. Thereto added dropwise was a solution in which 3.17 g of dimethylamine-borane was dissolved in 600 mL of water to reduce platinum. The solution was then concentrated to obtain 4 wt % Pt-PEI colloid.

(2) Production of P(CM)AA Protected Platinum Colloid (hereinafter Pt-P(CM)AA Colloid)

To a diammine dinitro platinum solution corresponding to 2 g of Pt was added 8 g of P(CM)AA and 2000 mL of water, and the mixture was heated to reflux. Thereto added dropwise was a solution in which 1.59 g of dimethylamine-borane was dissolved in 600 mL of water to reduce platinum. The solution was then concentrated to obtain 4 wt % Pt-P(CM)AA colloid.

(3) Production of P(DCM)AA Protected Platinum Colloid (hereinafter Pt-P(DCM)AA Colloid)

To a diammine dinitro platinum solution corresponding to 2 g of Pt was added 8 g of P(DCM)AA, 2000 mL of water and 500 mL of ethanol, and the mixture was heated to reflux to reduce platinum. The solution was then concentrated to obtain 4 wt % Pt-P(DCM)AA colloid.

(4) Production of P(CM)EI Protected Platinum Colloid (hereinafter Pt-P(CM)EI Colloid)

To a diammine dinitro platinum solution corresponding to 2 g of Pt was added 8 g of P(CM)EI, 2000 mL of water and 500 mL of ethanol, and the mixture was heated to reflux to reduce platinum. The solution was then concentrated to obtain 4 wt % Pt-P(CM)EI colloid.

C: Production of Multi-Element Metal Colloid

Multi-element metal colloid was prepared through addition of various kinds of metal salt solutions to the catalyst metal (platinum) colloids produced. Here, the metal salt solution and water were added to colloid (0.5 g) containing platinum equivalent to 20 mg so that the total was 50 mL. The amounts of the metal salt solutions added was such that the content of the metal based on the entire metal colloid solution was 1 mg, 2 mg, 5 mg, 10 mg and 20 mg. The kind of promoter metals and salts thereof studied in this embodiment are as described in Table 1.

TABLE 1

| | Kind of metal | Metal salt |
|---|---|---|
| Alkaline-earth metal | Mg | $Mg(NO_3)_2 \cdot 6H_2O$ |
| | Ca | $Ca(NO_3)_2 \cdot 4H_2O$ |

TABLE 1-continued

|  | Kind of metal | Metal salt |
|---|---|---|
|  | Sr | $Sr(NO_3)_2$ |
|  | Ba | $Ba(CH_3COO)_2$ |
| Transition metal | Y | $Y(NO_3)_3 \cdot 6H_2O$ |
|  | Zr | $ZrO(NO_3)_2 \cdot H_2O$ |
|  | Cr | $Cr(No)_3 \cdot 9H_2O$ |
|  | Mn | $Mn(NO_3)_2 \cdot 6H_2O$ |
|  | Fe | $Fe(NO_3)_3 \cdot 9H_2O$ |
|  | Co | $Co(NO_3)_3 \cdot 6H_2O$ |
|  | Ni | $Ni(NO_3)_2 \cdot 6H_2O$ |
|  | Ru | $Ru(NO_3)_3$ |
|  | Rh | $Rh(NO_3)_2$ |
|  | Pd | $Pd(NO_3)_2$ |
|  | Cu | $Cu(NO_3)_2 \cdot 3H_2O$ |
|  |  | $AgNO_2$ |
|  | Zn | $Zn(NO_3)_2 \cdot 3H_2O$ |
|  |  | $Cd(NO_3)_2 \cdot 4H_2O$ |
|  | In | $In(NO_3)_3 \cdot xH_2O$ |
| Rare earth metal | La | $La(NO_3) \cdot 6H_2O$ |
|  | Ce | $Ce(NO_3)_3 \cdot 6H_2O$ |
|  |  | $Pr(NO_3)_3 \cdot 6H_2O$ |
|  | Sm | $Sm(NO_3)_3 \cdot 6H_2O$ |
|  | Nd | $Nd(NO_3)_3 \cdot 6H_2O$ |
|  | Eu | $Eu(NO_3)_3 \cdot 6H_2O$ |
| Others | Al | $Al(NO_3)_3 \cdot 9H_2O$ |
|  | Ga | $Ga(NO_3)_3 \cdot xH_2O$ |

Water Solubility Test

First, it was examined to see whether the water solubility of each metal colloid produced was good or not. This examination was conducted through allowing the colloid solutions after production to stand for 24 hours and checking if the precipitation occurred or not.

Table 2 shows the result of examination of water solubilities based on the kind of promoter metals in the case of using PEI as a protective agent. Table 2 suggests that the metal colloids produced in this embodiment are free of occurrence of precipitation and have an excellent water solubility when the content of the promoter metal ions is 10 mg or less regardless of its kind.

TABLE 2

|  | Kind of promoter metal ion | | | |
|---|---|---|---|---|
| Content of metal ion | Alkaline-earth metal ion | Transition metal ion | Rare earth metal ion | Others (Al, Ga) |
| 1 mg | ◯ | ◯ | ◯ | ◯ |
| 2 mg | ◯ | ◯ | ◯ | ◯ |
| 3 mg | ◯ | ◯ | ◯ | ◯ |
| 10 mg | ◯ | ◯ | ◯ | ◯ |
| 20 mg | ◯ | X | X | X |

◯ No precipitation
X Precipitation occurred

Table 3 shows the result of examination of water solubilities based on the kind of protective agents in the case of using Zr of the transition metals as a promoter metal ion. Table 3 suggests that the metal colloids produced in this embodiment have excellent water solubility on the whole when the content of the promoter metal ions is 2 mg or less regardless of the kind of the protective agent.

TABLE 3

| Amount of Zr | Protective agent | | | |
|---|---|---|---|---|
|  | PEI | P(CM)AA | P(DCM)AA | P(CM)EI |
| 1 mg | ◯ | ◯ | ◯ | ◯ |
| 2 mg | ◯ | ◯ | ◯ | ◯ |
| 5 mg | ◯ | Δ | ◯ | ◯ |
| 10 mg | ◯ | X | X | X |
| 20 mg | X | X | X | X |

◯ No precipitation
Δ Little precipitation occurred
X Precipitation occurred

Production of Catalyst

Next, the produced multi-element metal colloids were supported on an alumina support to produce a catalyst. Here, adsorption properties at that time were examined. In this examination, first for examining if adsorption was possible or not depending on the kind of the promoter metal, the multi-element metal colloids of various promoter metal ion concentrations were adsorbed on alumina with the use of PEI as a protective agent by the following method.

1 g of alumina was added to 50 mL of a solution obtained through addition of an optional amount of an aqueous solution of each promoter metal ion and water to a PEI colloid solution (0.5 g) containing Pt equivalent to 20 mg. Ammonia was then added thereto with stirring vigorously to adjust pH to pH 10, whereby the colloid was adsorbed on alumina.

The colloid solution after the adsorption was filtrated and the supernatant liquid was collected. To 1 mL of the supernatant liquid was added 5 mL of aqua regia, and the mixture was heated to reflux. The volume was increased to 10 mL and analysis by ICP was conducted. Then the adsorption properties were determined based on the content of metal ions in the supernatant liquid, specifically from the difference between the platinum concentration and the promoter metal ion concentration of the supernatant liquid and those of the colloid solution before the adsorption which was used as a blank. The results are shown in Table 4.

TABLE 4

| Content of promoter metal ion | Before adsorption* | | After adsorption | | | | | | |
|---|---|---|---|---|---|---|---|---|---|
|  |  |  | Ca | | Ba | | Transition metal | | Rare earth metal | |
| ($M^{N+}$) | Pt | $M^{N+}$ | Pt | $M^{N+}$ | Pt | $M^{N+}$ | Pt | $M^{N+}$ | Pt | $M^{N+}$ |
| 1 mg | 40 | 2 | <1 | <1 | <1 | <1 | <1 | <1 | <1 | <1 |
| 2 mg | 40 | 4 | <1 | 1.07 | <1 | 1.03 | <1 | <1 | <1 | <1 |
| 5 mg | 40 | 10 | <1 | 1.85 | <1 | 1.75 | <1 | <1 | <1 | <1 |
| 10 mg | 40 | 20 | <1 | 4.02 | <1 | 3.64 | <1 | <1 | <1 | <1 |
| 20 mg | 40 | 40 | <1 | 7.7 | <1 | 7.80 | — | — | — | — |

(Unit: ppm)
— Unmeasurable due to occurrence of precipitation
*The platinum concentration and the promoter metal ion concentration before adsorption are constant regardless of the kind of the promoter metal ion.

Table 4 suggests that in the catalysts in which alkaline-earth metal ions are bonded, ions were substantially adsorbed when metal colloid containing 2 mg or less of promoter metal ions was used. In the cases of using transition metal ions and rare earth metal ions, these metal ion components are hardly observed and this suggests that they are bonded to polyethyleneimine portions of Pt colloid to be adsorbed and supported on alumina.

Next, the difference in adsorption properties based on the kind of the protective agent was examined. Here, various metal colloids in which Zr ions are bonded as a metal ion were adsorbed on alumina by the following method.

For PEI-Pt colloid, 1 g of alumina was added to 50 mL of a solution obtained through addition of an aqueous ZrO($NO_3$)$_2$ solution containing Zr ions equivalent to 1 mg and water to a colloid solution (0.5 g) containing Pt equivalent to 20 mg. Ammonia was then added thereto with stirring vigorously to adjust pH to pH 10, whereby the colloid was adsorbed on alumina. For P(CM)AA-Pt colloid and P(DCM) AA-Pt colloid and P(CM)EI-Pt colloid, 1 g of alumina was added to 50 mL of a solution obtained through addition of an aqueous ZrO($NO_3$)$_2$ solution containing Zr ions equivalent to 1 mg and water to a colloid solution (0.5 g) containing Pt equivalent to 20 mg. Nitric acid was then added to the solution with stirring vigorously to adjust pH to pH 4, whereby the colloid was adsorbed on alumina.

The platinum concentration and the metal ion concentration in the supernatant liquid of the colloid solution after the adsorption were measured in the same manner as described above and each adsorption properties was examined. The results are shown in Table 5.

TABLE 5

| Before adsorption | | PEI | | P(CM)AA | | P(DCM)AA | | P(CM)EI | |
| --- | --- | --- | --- | --- | --- | --- | --- | --- | --- |
| Pt | Zr | Pt | Zr | Pt | Zr | Pt | Zr | Pt | Zr |
| 40 | 2 | <1 | <1 | <1 | <1 | <1 | <1 | <1 | <1 |

(Unit: ppm)

As in understandable from Table 5, Pt ions or Zr ions were hardly found in the supernatant liquid of each metal colloid after the adsorption. It is thus confirmed that the metal colloids allowed Pt and Zr to be efficiently adsorbed on alumina.

Observation of Supporting State

Lastly, for alumina on which metal colloid containing PEI as a protective agent, Pt as a precious metal and Ce as metal ions were adsorbed, the supporting state of Pt and Ce was studied. In this test, metal colloid was prepared through addition of a Ce($NO_3$)$_3$.6$H_2O$ solution to Pt-PEI colloid similar to that described above so that the Ce content became 10 mg. The metal colloid was adsorbed on alumina as described above.

The supporting state was confirmed with the use of EPMA. As a result of the analysis, the presence of single particle of Pt or Ce was not observed, but particles in which the metal elements are in close vicinity with each other have been confirmed to be adsorbed.

Observation of Catalytic Properties:

The properties of the catalysts produced above were observed. For the evaluation, catalysts in which Ba, Fe, Co, Ni, Mo or Zr is supported as a promoter metal were used. The amount of catalyst metal supported was 2% by weight of Pt based on an alumina support, and the amount of promoter metal supported was 1% by weight in the case of Ba, Fe, Co, Ni or Mo (calculated based on metal) and 0.1% by weight in the case of Zr (calculated based on metal).

As Comparative Example for the composite catalyst produced in this embodiment, a conventional composite catalyst was produced and evaluated. The composite catalyst of Comparative Example was produced by first allowing an aqueous platinum salt solution to be supported on a support and then impregnating the support with an aqueous promoter metal salt solution. More specifically, alumina support was impregnated with a diammine dinitro platinum complex solution to allow platinum to be supported, and a Fe($NO_3$)$_3$.6$H_2O$ solution, a Co($NO_3$)$_2$.6$H_2O$ solution, a Ni($NO_3$)$_2$.6$H_2O$ solution, a $MoCl_5$ solution, a Ce($NO_3$)$_4$.6$H_2O$ solution, a Ba($CH_3COO$)$_2$ solution or a ZrO($NO_3$)$_2$ solution was then impregnated to allow each promoter metal to be supported. The amounts of each metal supported were the same as those in the embodiment.

For evaluating the catalytic properties, the catalysts were formed into 1 mm square particles and subjected to evaluation as a pellet catalyst. In this evaluation, the NOx adsorption properties of the Pt-Ba catalyst were first investigated. Specifically, the NOx adsorption property of the catalyst at an initial stage after production was evaluated, and after conducting an endurance test, the NOx adsorption property after the endurance test was studied. The NOx adsorption properties were evaluated through measuring amounts of NO adsorption after passing lean gas for 30 minutes and rich gas for 10 minutes at 400° C. with the use of gases with a composition shown in Table 6. The amount of gas introduced was 5 L/min per 1 g of catalyst. The endurance test was conducted through heating the catalyst in an electric oven at 700° C. for 5 hours under air. The NOx adsorption property of the catalyst after the endurance test was also evaluated.

TABLE 6

| | $CO_3$ (%) | CO (%) | HC (ppmC) | NO (ppm) | $O_3$ (%) | $H_3$ (%) | $H_3O$ (%) | $N_3$ |
| --- | --- | --- | --- | --- | --- | --- | --- | --- |
| Lean gas | 10 | 0 | 600 | 400 | 7 | 0 | 3 | Balance |
| Rich gas | 10 | 6 | 3000 | 400 | 0 | 3 | 3 | Balance |

Figure 1:
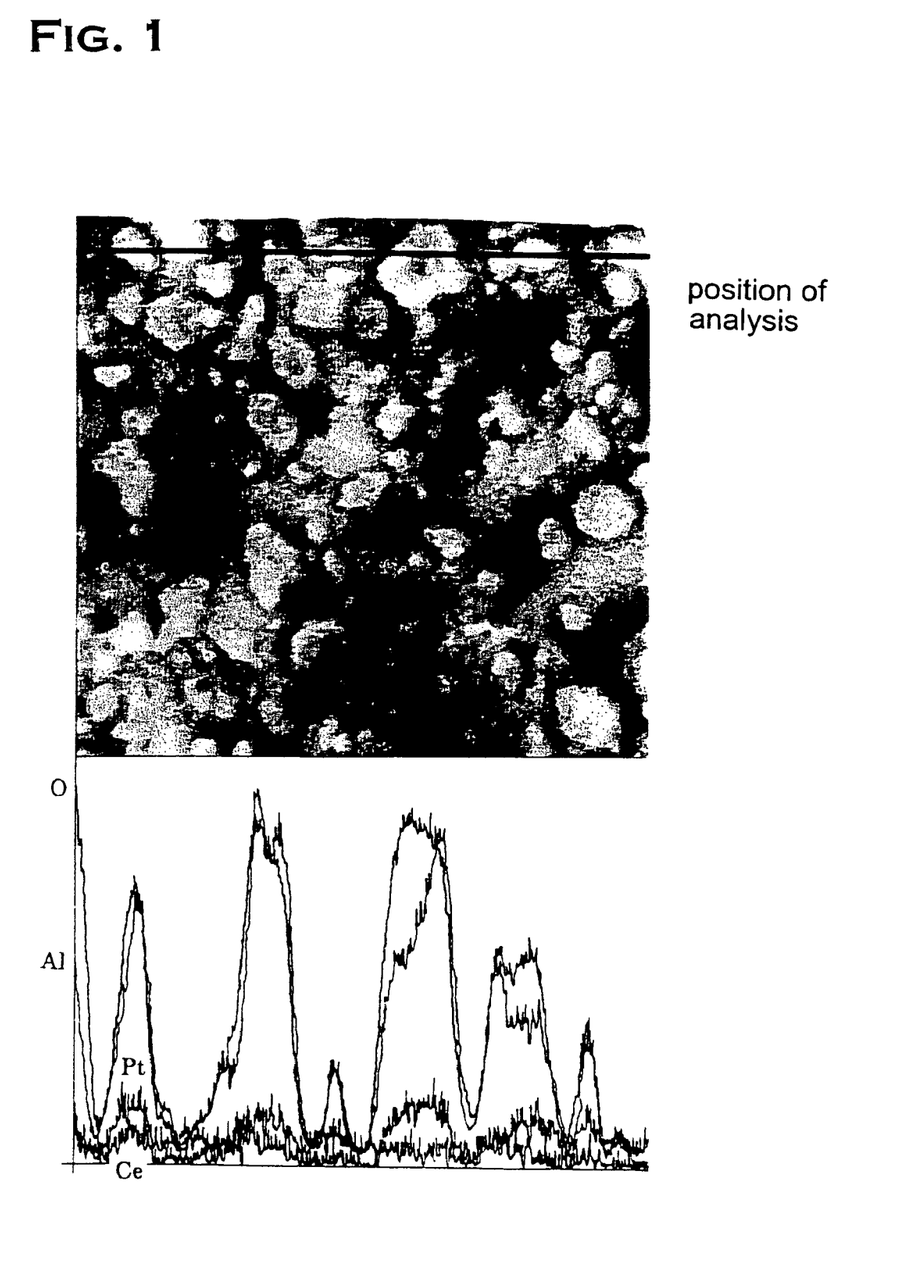
FIG. 1 illustrates the result of EPMA analysis of the catalyst produced in this embodiment.
Figure 2:
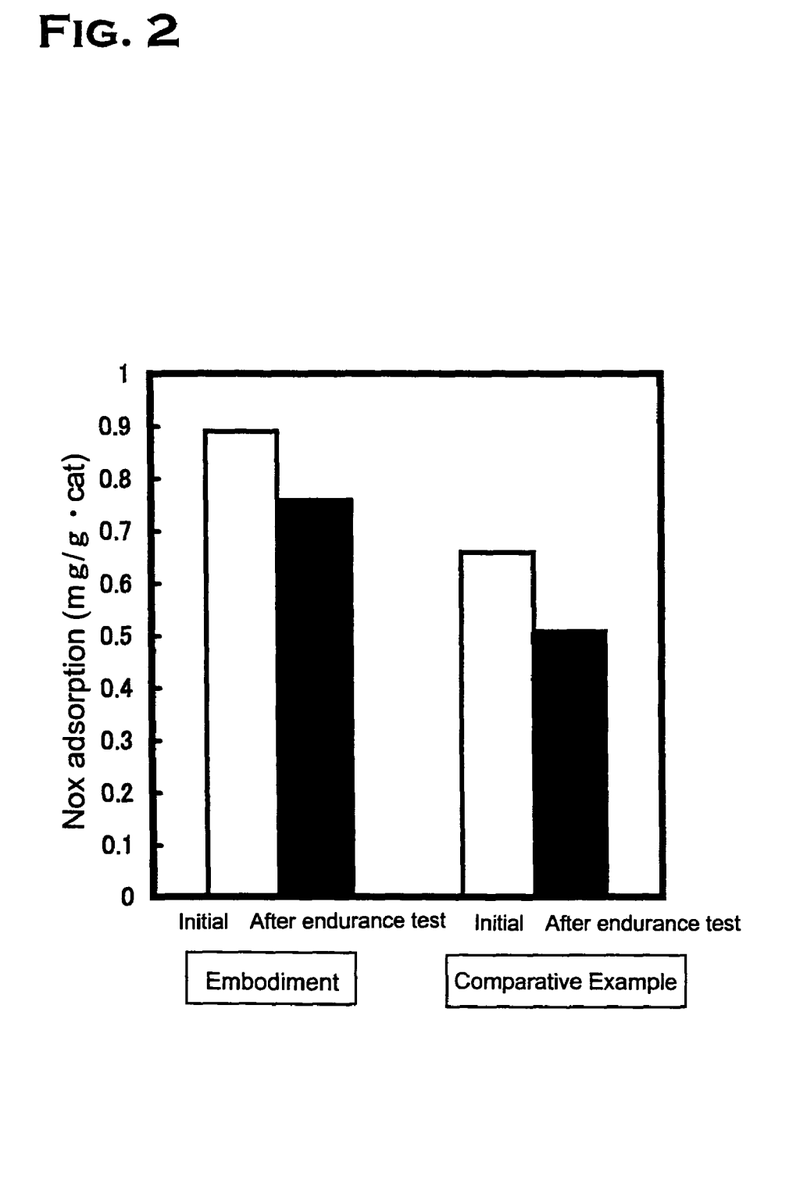
FIG. 2 is a view illustrating the result of evaluation of NOx adsorption characteristics of the catalyst produced in this embodiment.

The results of evaluation of the NOx adsorption properties are shown in FIG. 2. From FIG. 2, it is confirmed that the Pt-Ba catalyst of this embodiment has superior NOx adsorption properties compared to the conventional catalyst. This tendency is found both before and after the endurance test. These results are considered to be because Pt and Ba are supported in close vicinity with each other in this embodiment.

Next, as promoter metals, the exhaust gas purification property of the catalysts in which Fe, Co, Ni, Mo or Zr is supported was studied. For evaluating the exhaust gas purification property, an endurance test was first conducted to evaluate the exhaust gas purification property after the endurance test. The gases used in this evaluation test are shown in Table 7. For the endurance test, the temperature was set to 1000° C. and a procedure of switching passing of the lean gas shown in Table 7 every 1 minute was continued for 5 hours. For the catalyst after the endurance test, passing of the rich gas and the lean gas shown in Table 7 was switched at 1 Hz, and this was repeated while increasing the temperature of the gas. The temperature at which 50% of each gas component is cleaned was checked to evaluate the exhaust gas purification property. The amount of gas introduced was 5 L/min per 1 g of catalyst. This test was conducted also using a composite catalyst produced by a two-step impregnation procedure, which is a conventional catalyst, as Comparative Example.

TABLE 7

| | $CO_3$ (%) | CO (%) | $C_3H_6$ (ppmC) | NO (ppm) | $O_3$ (%) | $H_3$ (%) | $H_3O$ (%) | $N_3$ |
|---|---|---|---|---|---|---|---|---|
| Lean gas | 10 | 0.81 | 2500 | 2200 | 1.7 | 0 | 10 | Balance |
| Rich gas | 10 | 2.80 | 2500 | 2200 | 0.77 | 0.27 | 10 | Balance |

Figure 3:
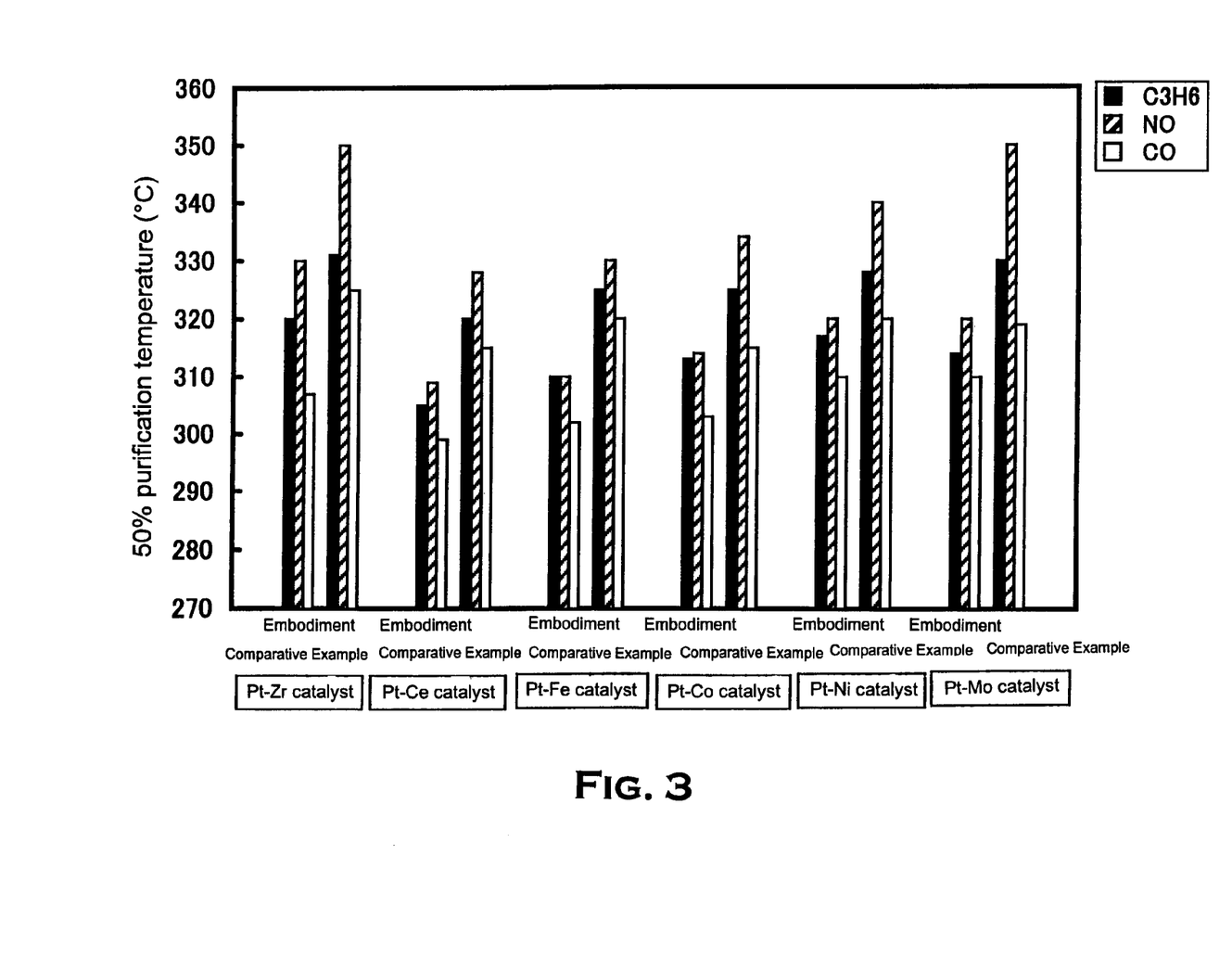
FIG. 3 is a view illustrating the result of evaluation of exhaust gas purification property of the catalyst produced in this embodiment.

FIG. 3 shows the results of evaluation of the exhaust gas purification property. As FIG. 3 shows, it has been confirmed that the catalysts of this embodiment have an excellent property in all cases where any promoter metal is used as evidenced by their 50% purification temperatures lower than that of the conventional catalyst. This is considered due to that Pt and each promoter metal are supported in close vicinity with each other in this embodiment as in the evaluation of the NOx adsorption.

The invention claimed is:

1. A method of producing a catalyst comprising a multi-element metal colloid solution, which colloid solution comprises, in a solvent, catalyst metal composed of one or more kinds of precious metals, a protective agent for protecting said catalyst metal, and a promoter metal composed of ions of at least one element selected from zirconium, cerium, iron, cobalt, nickel, molybdenum, and barium, the promoter metal being bonded to said protective agent, and the colloid solution is allowed to be attached to a support, thereby having the catalyst metal and the promoter metal carried on the support, comprising the steps of:

preparing an aqueous solution of a salt of said catalyst metal, adding a polymeric protective agent to said aqueous solution, followed by a reduction treatment, to thereby form a catalyst metal colloid solution;

further adding an aqueous solution of a salt of said promoter metal such that ions of the promoter metal bond to the protective agent, to thereby form a multi-element metal colloid solution; and having the multi-element metal colloid solution adhere to the support, to thereby have the catalyst metal and the promoter metal supported on the support, and wherein the protective agent is one member selected from polyallylamine, polyethyleneimine, poly(N-carboxymethyl)allylamine, poly(N,N- dicarboxymethyl)allylamine and poly(N-carboxymethyl)ethyleneimine.

2. The method of producing a catalyst according to claim 1, wherein the catalyst metal comprises at least one precious metal of gold, platinum, silver, palladium, rhodium, iridium, ruthenium and osmium.

3. A method of producing a catalyst according to claim 1, wherein the catalyst is burned.

* * * * *